United States Patent [19]

Grychtol et al.

[11] Patent Number: 5,529,872

[45] Date of Patent: Jun. 25, 1996

[54] ELECTROSTATIC TONERS CONTAINING A METAL COMPLEX DYE AS CHARGE STABILIZER

[75] Inventors: Klaus Grychtol, Bad Durkheim; Karin H. Beck, Ludwigshafen; Rainer Dyllick-Brenzinger, Weinheim, all of Germany

[73] Assignee: BASF Aktiengesellschaft, Ludwigshafen, Germany

[21] Appl. No.: 381,879

[22] PCT Filed: Aug. 12, 1993

[86] PCT No.: PCT/EP93/02130

§ 371 Date: Feb. 17, 1995

§ 102(e) Date: Feb. 17, 1995

[87] PCT Pub. No.: WO94/04962

PCT Pub. Date: Mar. 3, 1994

[30] Foreign Application Priority Data

Aug. 21, 1992 [DE] Germany .......................... 42 27 743.4

[51] Int. Cl.⁶ .................................................... G03G 9/097
[52] U.S. Cl. ........................................... 430/106; 430/110
[58] Field of Search ................................... 430/110, 106

[56] References Cited

U.S. PATENT DOCUMENTS

| 4,265,990 | 5/1981 | Stolka et al. ........................... 430/59 |
| 4,623,606 | 11/1986 | Ciccarelli ............................... 430/110 |
| 4,824,751 | 4/1989 | Matuura et al. ........................ 430/110 |
| 5,164,283 | 11/1992 | Niimura et al. ........................ 430/110 |
| 5,439,770 | 8/1995 | Taya et al. ............................. 430/110 |

FOREIGN PATENT DOCUMENTS

| 0251326 | 1/1988 | European Pat. Off. . |
| 0255925 | 2/1988 | European Pat. Off. . |
| 180655 | 4/1988 | European Pat. Off. . |
| 393479 | 4/1990 | European Pat. Off. . |
| 0503861 | 9/1992 | European Pat. Off. . |
| 2317469 | 10/1973 | Germany . |
| 62-129358 | 6/1987 | Japan . |
| 63-170657 | 7/1988 | Japan . |
| 2236567 | 3/1989 | Japan . |
| 2096180 | 4/1990 | Japan . |
| WO84/04776 | 12/1984 | WIPO . |

*Primary Examiner*—Mark F. Huff
*Attorney, Agent, or Firm*—Oblon, Spivak, McClelland, Maier & Neustadt

[57] ABSTRACT

An electrostatic toner contains a polymeric binder and as charge stabilizer a 1:2 chromium, iron, cobalt or zirconium complex of azo dyes of the formula D—N=N—K, where D is derived from a diazo component D—NH₂ selected from the group consisting of 2-amino-4-nitrophenol, 2-amino-5-nitrophenol, 2-amino-phenol-4-sulfonamide, anthranilic acid and picramic acid and K is derived from a coupling component K—H selected from the group consisting of β-naphthol, acetoacetanilide and 1-phenyl-3-methylpyrazol-5-one.

5 Claims, No Drawings

ELECTROSTATIC TONERS CONTAINING A METAL COMPLEX DYE AS CHARGE STABILIZER

The present invention relates to novel electrostatic toners containing a polymeric binder and as charge stabilizer a 1:2 zirconium complex of azo dyes of the formula D—N=N—K, where D is derived from a diazo component D—NH$_2$ selected from the group consisting of 2-amino -4-nitrophenol, 2-amino-5-nitrophenol, 2-aminophenol-4-sulfonamide, anthranilic acid and picramic acid and K is derived from a coupling component K—H selected from the group consisting of β-naphthol, acetoacetanilide and 1-phenyl-3-methylpyrazol-5-one, and to the use of the abovementioned metal complexes as charge stabilizers in electrostatic toners.

Latent electrostatic image recordings are developed by inductively depositing the toner on the electrostatic image. The charge stabilizers stabilize the electrostatic charge of the toner. This makes the image stronger and crisper.

The charge stabilizers used have to meet various requirements:

Ability to develop the latent electrostatic image to a tinctorially strong visible image.

Ready dispersibility in the toner preparation to produce a defect-free, crisp, uniform image.

Imperviousness to moisture.

High thermal stability.

U.S. Pat No. 4,623,606, EP-A-144 377, EP-A-180 655, EP-A-393 479, JP-A-129 358/1987 and JP-A-236 567/1990 disclose electrostatic toners containing metal complexes of azo dyes as charge stabilizers.

However, the prior art charge stabilizers have frequently been found to have defects in their property profile.

Similarly DE-A-2 317 469, EP-A-251 326, EP-A-255 925, JP-A-170 657/1988 and EP-A-503 861 describe electrostatic toners which contain 1:2 metal complexes of azo dyes as charge stabilizers, but the complexes are derived from the metals chromium, manganese, iron or cobalt.

It is an object of the present invention to provide a novel electrostatic toner equipped with charge stabilizers having advantageous application properties.

We have found that this object is achieved by the electrostatic toners defined at the beginning.

The 1:2 zirconium complexes of azo dyes are preferably the symmetrical 1:2 complexes.

The proportion of the 1:2 metal complex dye in the electrostatic toner is in general from 0.01 to 10% by weight, based on the weight of the toner.

The polymeric binders present in the novel electrostatic toners are known. They are in general thermoplastic and have a softening point of from 40° to 200° C., preferably of 50° to 130° C., in particular of from 65° to 115° C. Examples of polymeric binders are polystyrene, copolymers of styrene with an acrylate or methacrylate, copolymers of styrene with butadiene and/or acrylonitrile, polyacrylates, polymethacrylates, copolymers of an acrylate or methacrylate with vinyl chloride or vinyl acetate, polyvinyl chloride, copolymers of vinyl chloride with vinylidene chloride, copolymers of vinyl chloride with vinyl acetate, polyester resins, epoxy resins, polyamides and polyurethanes.

In addition to the abovementioned 1:2 metal complex dyes and the polymeric binders, the toners of the invention may contain known amounts of colorants, a magnetically attractable material, waxes and free-flow agents.

The colorants can be organic dyes or pigments, such as nigrosine, aniline blue, 2,9-dimethylquinacridone, C.I. Disperse Red 15 (C.I. 6010), C.I. Solvent Red 19 (C.I. 26 050), C.I. Pigment Blue 15 (C.I. 74 160), C.I. Pigment Blue 22 (C.I. 69 810) or C.I. Solvent Yellow 16 (C.I. 12 700), or inorganic pigments, such as carbon black, red lead, yellow lead oxide or chromium yellow. In general, the amount of colorant present in the toner does not exceed 15% by weight, based on the weight of the toner.

The magnetically attractable material can be for example iron, nickel, chromium oxide, iron oxide or a ferrite of the formula MeFe$_2$O$_4$ where Me is a divalent metal, e.g. iron, cobalt, zinc, nickel or manganese.

The 1:2 metal complex dyes can be obtained in a conventional manner, for example by first using an azo dye of the formula

where D and K are each as defined above, and a zirconium salt (e.g. the respective chlorides or sulfates or else the corresponding zirconyl compounds) to prepare the 1:1 metal complex and reacting it with an azo dye of the formula

where D$^1$ and K$^1$ each have the meanings of D and K, to form the 1:2 complex.

As mentioned earlier, however, it is also possible to prepare the 1:2 metal complex by a single-stage reaction of the dyes D—N=N—K and D$^1$—N=N—K$^1$ with a zirconium salt.

The toners of the invention are prepared in a conventional manner, for example by mixing the ingredients in a kneader and then pulverizing or melting the polymeric binder or the mixture of polymeric binders, then finely dispersing one or more 1:2 metal complex dyes and the other additives, if used, in the molten resin using the mixing and heading machines known for this purpose, then cooling down the melt to form a solid mass and finally grinding the solid mass to particles of the desired size (in general from 0.1 to 50 μm). It is also possible to suspend the polymeric binder and the charge stabilizer in a common solvent and to add the other additives to the suspension. In this way the suspension can be used as a liquid toner.

However, the liquid can also be spray dried in a conventional manner, or the solvents can be evaporated off and the solid residue ground to particles of the desired size.

It is also possible not to dissolve the 1:2 metal complex charge stabilizers but to disperse them finely in the solution of the polymeric binder. The toner preparation thus obtained can then be used in a xerographic image recording system, for example as described in U.S. Pat No. 4,265,990.

The abovementioned 1:2 zirconium complexes are advantageous charge stabilizers. In general they meet the property profile stipulated at the beginning and are particularly notable for the fact that, when added to a toner preparation, they confer on it an advantageous electrostatic chargeup profile; that is, the toners can be charged up quickly and to a high level. The charge stabilizers of the invention also have the effect that the charge is kept constant at a high level.

The Examples which follow illustrate the invention:
A) Preparation of complex dyes

EXAMPLE P1

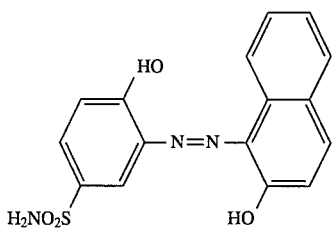

(1:2 ziconium complex)

33 g of the azo dye formed from 1-hydroxy-2-aminobenzene-4-sulfonamide and β-naphthol and 40 g of zirconyl chloride were introduced into 600 ml of ethylene glycol. The mixture was heated to 135° C. and subsequently stirred at that temperature for 4 hours, at which point starting material was no longer detectable by thin layer chromatography. After cooling down, the batch was run into 3000 ml of water and 30 ml of concentrated hydrochloric acid. Following stirring for 10 minutes, pH 4.3 was set with anhydrous sodium acetate. Finally the batch was filtered with suction and the filter residue was dried.

44 g of a red powder were obtained.

EXAMPLE P2

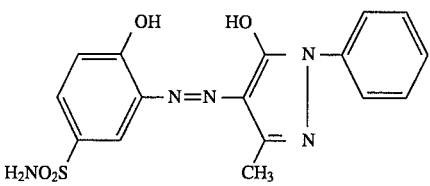

(1:2 zirconium complex)

45 g of the azo dye formed from 1-hydroxy-2-aminobenzene-4-sulfonamide and 1-phenyl-3-methylpyrazol -5-one and 40 g of zirconyl chloride were introduced into 750 ml of ethylene glycol. The temperature was raised to 150° C., and a clear solution formed. The temperature was held for 5 hours and the batch was subsequently stirred overnight at room temperature. Partial precipitation of the dye occurred. The precipitation of the dye was completed at pH 6.3 by diluting with aqueous sodium acetate solution. The dye was filtered off with suction, washed with water and dried to leave 75 g of red powder.

The same method can be used to obtain the zirconium complexes of the following azo dyes:

Example No.

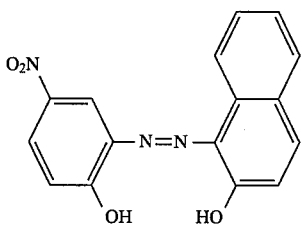

P3

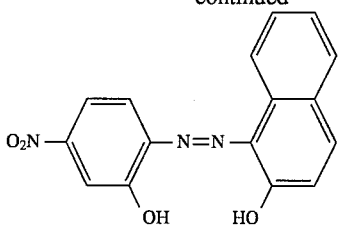

P4

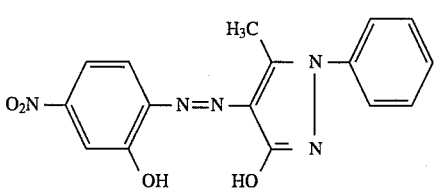

P5

B) Use

The use examples were carried out with colorant-free toner models consisting of resin and the charge stabilizers of the invention.

I. Preparation of toners

EXAMPLE U1

A solution of 10 g of a noncrosslinked styrene/butyl acrylate resin in 100 ml of xylene was admixed at room temperature with 0.2 g of the dye of Example P1 and then freeze dried. This was followed by grinding and classification to produce toner particles having an average particle size of 50 μm.

EXAMPLE U2

In a mixer 10 g of a noncrosslinked styrene/butyric acrylate resin and 0.2 g of the dye of Example P1 were intensively mixed, headed at 120° C., extruded and ground. Classification was employed to obtain toner particlels having an average particle size of 50 μm.

II. Preparation of developers and testing

To prepare a developer 99% by weight of a steel carrier having an average particle size of 50 μm was weighed out accurately with 1% by weight of the toner and activated on a roll stand for 30 minutes. Then the electrostatic charge on the developer was determined. About 5 g of the activated developer were introduced in a commercial q/m meter (from Epping GmbH, Neufahrn) into a hard blowoff cell electrically connected to an electrometer. The mesh size of the screens used in the measuring cell was 50 mm.

This ensured maximum blowout of the toner while the carrier remained in the measuring cell. A fast airstream (about 4000 cm³/min) with simultaneous aspiration was employed to remove the toner almost completely from the carrier particles with the latter remaining in the measuring cell. The charge on the carrier was recorded by the electrometer. It corresponded to the amount of charge on the toner particles, equipped with the opposite sign. To calculate the q/m value, therefore, the amount of q of the opposite sign was used. The measuring cell was weighed back to determine the mass of blown-out toner and hence the electrostatic charge q/m.

The charge determined on the toners is summarized below in the table.

TABLE

| Example No. | Compound of Example | Preparation of toner* | Charge following activation for [μC/g] | | | |
|---|---|---|---|---|---|---|
| | | | 10 min | 30 min | 60 min | 120 min |
| U1 | P1 | F | −11.8 | −11.6 | −13.3 | −13.7 |
| U2 | P1 | K | −10.4 | −10.0 | −9.8 | −10.0 |
| U3 | P2 | F | −10.7 | −10.9 | −11.7 | −13.0 |
| U4 | P3 | F | −12.4 | −11.2 | −11.1 | −11.4 |

*The preparation of the toner in Examples U3 and U4 was effected by freeze drying as per Example U1 (identified by "F" in the table). Kneading at a temperature above the softening point of the resin as per Example U2 is identified by "K" in the table.

TABLE 2

| Example No. | Azo dye | Color |
|---|---|---|
| P7 | (structure) | brown |
| P8 | (structure) | green |
| P9 | (structure) | grayish blue |
| P10 | (structure) | olive |

EXAMPLE P11

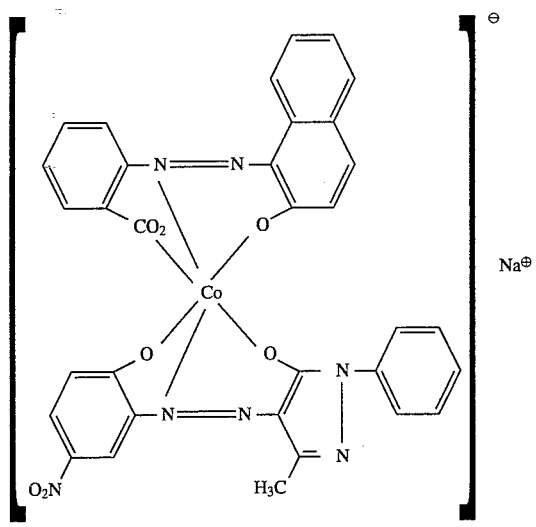

9 g of the azo dye from anthranilic acid and β-naphthol and 10.3 g of the azo dye from 2-amino-4-nitrophenol and 1-phenyl-3-methylpyrazol-5-one were dissolved in 300 ml of N-methylpyrrolidinone. The pH was adjusted to 8–9 with sodium hydroxide solution and the mixture was heated to 70°–80° C. Then 6 g of cobalt(II) chloride hexahydrate were sprinkled in and the mixture was stirred at 70° C. for one hour. The hot solution was filtered and the filtrate was added to a solution of 150 g of sodium chloride in 1000 ml of water. A pH of from 3 to 4 were set with dilute hydrochloric acid, and then the mixture was filtered with suction and the filter residue was dried. This left 21.9 g of a brown powder which conforms essentially to the abovementioned formula but which still contained a minor amount of the symmetrical 1:2 complexes of the azo dyes employed.

The same method gives the random mixed cocomplexes listed below in Table 3.

TABLE 3

| Example No. | Azo dye 1 | Azo dye 2 | Color |
|---|---|---|---|
| P12 | 1-(2-carboxyphenylazo)-2-naphthol | 1-(5-nitro-2-hydroxyphenylazo)-2-naphthol | brown |
| P13 | 1-(2-carboxyphenylazo)-2-naphthol | 1-(4-nitro-2-hydroxyphenylazo)-2-naphthol | gray |
| P14 | 1-(2-carboxyphenylazo)-2-naphthol | 1-(5-sulfamoyl-2-hydroxyphenylazo)-2-naphthol | brown |
| P15 | 1-(2-carboxyphenylazo)-2-naphthol | 1-(3,5-dinitro-2-hydroxyphenylazo)-2-naphthol | brown |
| P16 | 1-(2-carboxyphenylazo)-2-naphthol | pyrazolone-type azo dye with 5-nitro-2-hydroxyphenyl | olive |
| P17 | 1-(2-carboxyphenylazo)-2-naphthol | acetoacetanilide-type azo dye with 5-nitro-2-hydroxyphenyl | brown |
| P18 | pyrazolone-type azo dye with 5-nitro-2-hydroxyphenyl | 1-(5-nitro-2-hydroxyphenylazo)-2-naphthol | brown |

TABLE 3-continued

| Example No. | Azo dye 1 | Azo dye 2 | Color |
|---|---|---|---|
| P12 | | | brown |
| P20 | | | reddish brown |
| P21 | | | brown |
| P22 | | | orange |
| P23 | | | orange |
| P24 | | | reddish brown |
| P25 | | | brown |

TABLE 3-continued

| Example No. | Azo dye 1 | Azo dye 2 | Color |
|---|---|---|---|
| P26 | 1-(5-nitro-2-hydroxyphenylazo)-2-hydroxynaphthalene | 2-(5-nitro-2-hydroxyphenylazo)-3-hydroxy-2-butenoic acid anilide | brown |
| P27 | 1-(4-nitro-2-hydroxyphenylazo)-2-hydroxynaphthalene | 2-(2-carboxyphenylazo)-1-phenylhydrazono-1-hydroxy-2-butene | brown |
| P28 | 1-(4-nitro-2-hydroxyphenylazo)-2-hydroxynaphthalene | 2-(5-nitro-2-hydroxyphenylazo)-3-hydroxy-2-butenoic acid anilide | green |
| P29 | 1-(5-sulfamoyl-2-hydroxyphenylazo)-2-hydroxynaphthalene | 1-(5-nitro-2-hydroxy-3-nitrophenylazo)-2-hydroxynaphthalene | violet |
| P30 | 1-(5-sulfamoyl-2-hydroxyphenylazo)-2-hydroxynaphthalene | 2-(2-carboxyphenylazo)-1-phenylhydrazono-1-hydroxy-2-butene | brown |
| P31 | 1-(5-sulfamoyl-2-hydroxyphenylazo)-2-hydroxynaphthalene | 2-(5-nitro-2-hydroxyphenylazo)-3-hydroxy-2-butenoic acid anilide | brown |
| P32 | 1-(3,5-dinitro-2-hydroxyphenylazo)-2-hydroxynaphthalene | 2-(2-carboxyphenylazo)-1-phenylhydrazono-1-hydroxy-2-butene | olive |

TABLE 3-continued

| Example No. | Azo dye 1 | Azo dye 2 | Color |
|---|---|---|---|
| P33 | (structure) | (structure) | brown |
| P34 | (structure) | (structure) | orange |

EXAMPLE P35

1:2 iron complex of the azo dyes

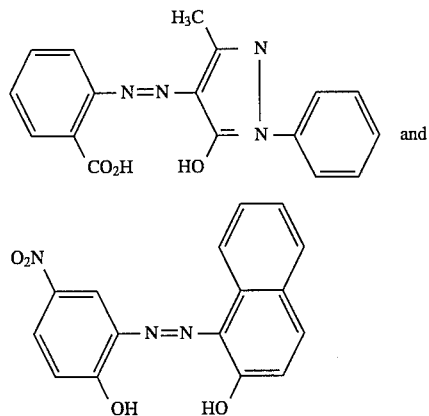

and as ethanolamine salt 16 g of the azo dye formed from anthranilic acid and 1-phenyl-3-methylpyrazol-5-one and 15.4 g of the azo dye formed from 2-amino-4-nitrophenol and β-naphthol were admixed in 200 ml of ethylene glycol with 14 g of iron(II) sulfate. Then 12 g of ethanolamine were added dropwise at 100° C. and the mixture was stirred at 100° C. for five hours until the two azo dyes were no longer detectable by chromatography.

After cooling down, the mixture was poured into 2000 ml of water, the pH was adjusted to 6.5, the mixture was stirred for two hours and filtered with suction, and the filter residue was washed with water and dried.

This left 35 g of a brownish olive powder. If the bases mentioned in Example 1 are used, useful products are obtained too.

The dye can also be prepared in water or N-methylpyrrolidinone as reaction medium.

The same method gives the brown iron complexes listed below in Table 4.

TABLE 4

| Example No. | Azo dye 1 | Azo dye 2 |
|---|---|---|
| P36 | (structure) | (structure) |

TABLE 4-continued

| Example No. | Azo dye 1 | Azo dye 2 |
|---|---|---|
| P37 | 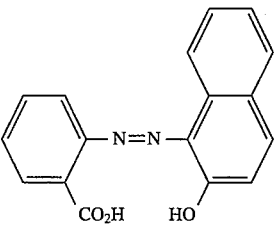 | 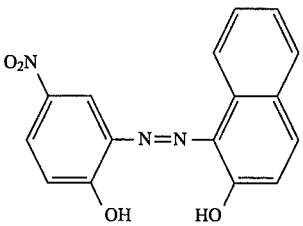 |
| P38 | 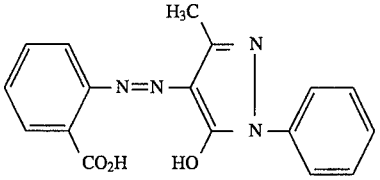 | 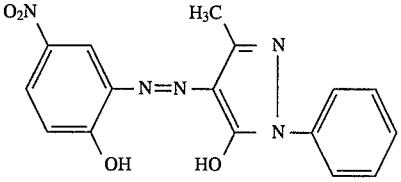 |
| P39 | 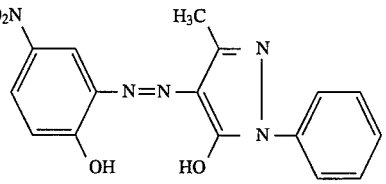 | 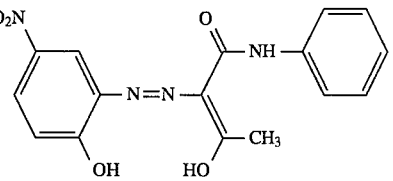 |
| P40 | 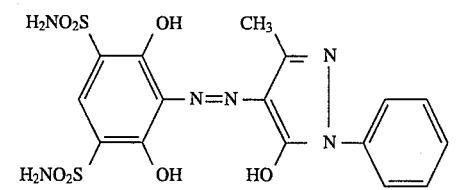 | azo dye 1 (symmetrical 1:2 complex) |

EXAMPLE: P41

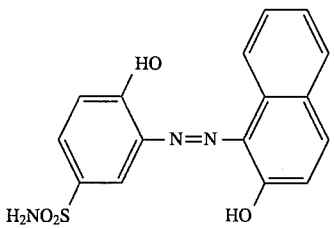

(1:2 zirconium complex)

33 g of the azo dye formed from 1-hydroxy-2-aminobenzene-4-sulfonamide and β-naphthol and 40 g of zirconyl chloride were introduced into 600 ml of ethylene glycol. The mixture was heated to 135° C. and subsequently stirred at that temperature for 4 hours, at which point starting material was no longer detectable by thin layer chromatography. After cooling down, the batch was run into 3000 ml of water and 30 ml of concentrated hydrochloric acid. Following stirring for 10 minutes, pH 4.3 was set with anhydrous sodium acetate. Finally the batch was filtered with suction and the filter residue was dried.

44 g of a red powder were obtained.

EXAMPLE P42

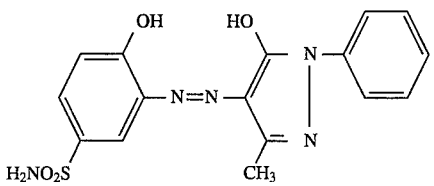

(1:2 zirconium complex)

45 g of the azo dye formed from 1-hydroxy-2-aminobenzene-4-sulfonamide and 1-phenyl-3-methylpyrazol -5-one and 40 g of zirconyl chloride were introduced into 750 ml of ethylene glycol. The temperature was raised to 150° C., and a clear solution formed. The temperature was held for 5 hours and the batch was subsequently stirred overnight at room temperature. Partial precipitation of the dye occurred. The precipitation of the dye was completed at pH 6.3 by diluting with aqueous sodium acetate solution. The dye was filtered off with suction, washed with water and dried to leave 75 g of red powder.

The same method can be used to obtain the zirconium complexes of the following azo dyes:

Example: No.

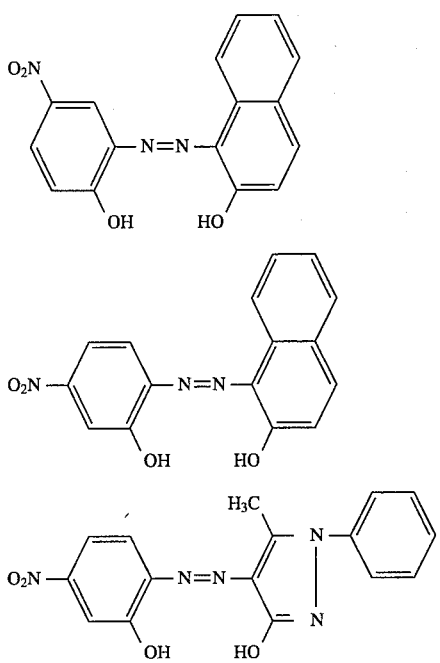

P43

P44

P45

B) Use

The use examples were carried out with colorant-free toner models consisting of resin and the charge stabilizers of the invention.

I. Preparation of toners

EXAMPLE U1

A solution of 10 g of a noncrosslinked styrene/butyl acrylate resin in 100 ml of xylene was admixed at room temperature with 0.2 g of the dye of Example P1 and then freeze dried. This was followed by grinding and classification to produce toner particles having an average particle size of 50 μm.

EXAMPLE U2

In a mixer 10 g of a noncrosslinked styrene/butyric acrylate resin and 0.2 g of the dye of Example P1 were intensively mixed, headed at 120° C., extruded and ground. Classification was employed to obtain toner particles having an average particle size of 50 μm.

EXAMPLE U3

A solution of 10 g of a linear, noncrosslinked polyester resin in 100 ml of p-xylene was admixed at room temperature with 0.2 g of the compound of Example P40 and then freeze dried. This was followed by grinding and classification to produce toner particles having an average particle size of 50 μm.

EXAMPLE U4

In a mixer 10 g of a linear, noncrosslinked polyester resin and 0.2 g of the compound of Example P40 were intensively mixed, headed at 120° C., extruded and ground. Classification was employed to obtain toner particles having an average particle size of 50 μm.

II. Preparation of developers and testing

To prepare a developer 99% by weight of a steel carrier having an average particle size of 50 μm was weighed out accurately with 1% by weight of the toner and activated on a roll stand for 30 minutes. Then the electrostatic charge on the developer was determined. About 5 g of the activated developer were introduced in a commercial q/m meter (from Epping GmbH, Neufahrn) into a hard blowoff cell electrically connected to an electrometer. The mesh size of the screens used in the measuring cell was 50 mm.

This ensured maximum blowout of the toner while the carrier remained in the measuring cell. A fast airstream (about 4000 cm$^3$/min) with simultaneous aspiration was employed to remove the toner almost completely from the carrier particles with the latter remaining in the measuring cell. The charge on the carrier was recorded by the electrometer. It corresponded to the amount of charge on the toner particles, equipped with the opposite sign. To calculate the q/m value, therefore, the amount of q of the opposite sign was used. The measuring cell was weighed back to determine the mass of blown-out toner and hence the electrostatic charge q/m.

The charge determined on the toners is summarized below in Table 5.

TABLE 5

| Example No. | Compound of Example | Preparation of toner* | Charge following activation for |  |  |  |
|---|---|---|---|---|---|---|
| | | | 10 min | 30 min | 60 min | 120 min |
| | | | [μC/g] | | | |
| U1 | P1 | F | −15.9 | −18.1 | −17.3 | −17.3 |
| U2 | P1 | K | −11.2 | −11.2 | −10.6 | −10.2 |
| U3 | P41 | F | −11.8 | −11.6 | −13.3 | −13.7 |
| U4 | P41 | K | −10.4 | −10.0 | −9.8 | −10.0 |
| U5 | P8 | F | −15.4 | −18.9 | −18.7 | −16.7 |
| U6 | P12 | F | −18.4 | −20.8 | −19.5 | −17.9 |
| U7 | P22 | F | −16.9 | −19.8 | −18.6 | −20.4 |
| U8 | P27 | F | −15.1 | −17.8 | −18.7 | −19.8 |
| U9 | P28 | F | −15.0 | −15.0 | −14.8 | −14.7 |
| U10 | P28 | K | −9.4 | −7.8 | −6.5 | −5.9 |
| U11 | P38 | F | −16.3 | −16.3 | −17.6 | −16.9 |
| U12 | P38 | K | −11.1 | −11.5 | −11.7 | −11.2 |
| U13 | P42 | F | −10.7 | −10.9 | −11.7 | −13.0 |
| U14 | P43 | F | −12.4 | −11.2 | −11.1 | −11.4 |

*The preparation of the toner was effected either by freeze drying as per Example U1 (identified by "F" in the table) or by kneading at a temperature above the softening point of the resin as per Example A2 (identified by "K" in the table).

We claim:

1. An electrostatic toner containing a polymeric binder and as charge stabilizer, a 1:2 zirconium complex of azo dyes of the formula

D—N=N—K wherein D is the radical component D of a compound D—NH$_2$ selected from the group consisting of 2-amino-4-nitrophenol, 2-amino-5-nitrophenol, 2-amino-phenol-4-sulfonamide, anthranilic acid and picramic acid; and K is the radical component K of a coupling component K—H selected from the group consisting of β-naphthol, acetoacetanilide and 1-phenyl-3-methylpyrazole-5-one.

2. An electrostatic toner as claimed in claim 1, containing a symmetrical 1:2 zirconium complex of azo dyes as charge stabilizer.

3. An electrostatic toner as claimed in claim 1 containing from 0.01 to 10% by weight, based on the weight of the toner, of a 1:2 zirconium complex of azo dyes.

4. An electrostatic toner as claimed in claim 1 containing additionally a colorant.

5. A method of charge stabilization of an electrostatic toner comprising mixing i) a charge stabilizer comprising a 1:2 zirconium complex of azo dyes of the formula

D—N=N—K wherein D is the radical component D of a compound D—$NH_2$ selected from the group consisting of 2-amino-4-nitrophenol, 2-amino-5-nitrophenol, 2-amino-phenol-4-sulfonamide, anthranilic acid and picramic acid; and K is the radical component K of a coupling component K—H selected from the group consisting of β-naphthol, acetoacetanilide and 1-phenyl-3-methylpyrazole-5-one; and ii) a polymeric binder.

* * * * *